United States Patent [19]

Wright

[11] Patent Number: 5,288,309
[45] Date of Patent: Feb. 22, 1994

[54] FLUE GAS CONDITIONING AGENT DEMAND CONTROL APPARATUS

[75] Inventor: Robert A. Wright, Indianapolis, Ind.

[73] Assignee: Wilhelm Environmental Technologies, Inc., Indianapolis, Ind.

[21] Appl. No.: 882,835

[22] Filed: May 14, 1992

Related U.S. Application Data

[63] Continuation-in-part of Ser. No. 864,847, Apr. 7, 1992.

[51] Int. Cl.⁵ .......................... B03C 3/01; B03C 3/68
[52] U.S. Cl. .......................................... 96/22; 96/18
[58] Field of Search ............... 423/522, 244.09, 244.1, 423/533; 422/134, 160, 164, 171, 177, 178, 180, 211; 55/5, 106; 96/18, 22; 95/2, 6

[56] References Cited

U.S. PATENT DOCUMENTS

| | | | |
|---|---|---|---|
| 1,441,713 | 1/1923 | Prosser | 55/5 |
| 1,909,825 | 5/1933 | Hahn et al. | 55/4 |
| 2,602,734 | 7/1952 | Hedberg et al. | 75/1 |
| 2,864,456 | 12/1958 | Hall et al. | 183/7 |
| 3,284,990 | 11/1966 | Orne | 55/5 |
| 3,363,398 | 1/1968 | Wheatcroft et al. | 55/5 |
| 3,424,560 | 1/1969 | Carmassi et al. | 423/567 R |
| 3,523,407 | 8/1970 | Humbert | 55/106 |
| 3,568,403 | 3/1971 | Richardson | 55/5 |
| 3,581,463 | 6/1971 | Roberts | 55/4 |
| 3,607,034 | 9/1971 | Henry et al. | 423/522 |
| 3,665,676 | 5/1972 | McKewen | 55/4 |
| 3,686,825 | 8/1972 | Busby | 55/5 |
| 3,689,213 | 9/1972 | Guerrieri | 55/5 |
| 3,704,569 | 12/1972 | Hardison et al. | 55/4 |
| 3,719,471 | 3/1973 | Jones | 75/65 |
| 3,722,178 | 3/1973 | Aaland et al. | 55/4 |
| 3,818,682 | 6/1974 | Farrow et al. | 55/106 |
| 3,893,828 | 7/1975 | Archer | 55/104 |
| 3,966,436 | 6/1976 | Archer | 55/147 |
| 3,993,429 | 11/1976 | Archer | 431/5 |
| 4,035,165 | 7/1977 | Archer | 55/13 |
| 4,042,348 | 8/1977 | Bennett et al. | 55/5 |
| 4,058,372 | 11/1977 | DeLaMater | 55/5 |
| 4,205,630 | 6/1980 | Regan | 122/1 R |
| 4,208,192 | 6/1980 | Quigley et al. | 55/5 |
| 4,223,640 | 9/1980 | Rochford et al. | 122/1 R |
| 4,284,417 | 8/1981 | Reese et al. | 55/2 |
| 4,305,909 | 12/1981 | Willett et al. | 422/169 |
| 4,333,746 | 6/1982 | Southam | 55/106 |
| 4,390,831 | 6/1983 | Byrd et al. | 423/240 |
| 4,466,815 | 8/1984 | Southam | 55/122 |
| 4,533,364 | 8/1985 | Altman et al. | 55/5 |
| 4,548,789 | 10/1985 | Ballestra | 422/160 |
| 4,624,685 | 11/1986 | Lueckenotte et al. | 55/13 |
| 4,770,674 | 9/1988 | Tellini et al. | 55/5 |
| 4,779,207 | 10/1988 | Woracek et al. | 364/500 |
| 4,844,723 | 7/1989 | Tellini et al. | 55/106 |
| 4,931,265 | 6/1990 | Leussler | 423/244.09 |
| 4,966,610 | 10/1990 | Krigmont et al. | 55/5 |
| 4,987,839 | 1/1991 | Krigmont et al. | 110/216 |
| 5,008,628 | 4/1991 | Krigmont et al. | 324/693 |
| 5,011,516 | 4/1991 | Altman et al. | 55/5 |
| 5,024,171 | 6/1991 | Krigmont et al. | 110/345 |
| 5,029,535 | 7/1991 | Krigmont et al. | 110/345 |
| 5,032,154 | 7/1991 | Wright | 55/106 |

FOREIGN PATENT DOCUMENTS

| | | |
|---|---|---|
| 639992 | 5/1964 | Belgium . |
| 888086 | 12/1971 | Canada . |
| 1178025 | 11/1984 | Canada . |
| 2809199 | 9/1979 | Fed. Rep. of Germany . |
| 3108709 | 9/1982 | Fed. Rep. of Germany . |
| 3109847 | 9/1982 | Fed. Rep. of Germany . |
| 4513927 | 5/1970 | Japan . |
| 1093617 | 12/1967 | United Kingdom ........... B03C 9/00 |
| 1406109 | 9/1975 | United Kingdom ........... B05D 1/10 |

Primary Examiner—Gary P. Straub
Attorney, Agent, or Firm—Willian Brinks Hofer Gilson & Lione

[57] ABSTRACT

The present invention relates to a flue gas conditioning agent demand control apparatus for controlling a flow of conditioning agent for removal of entrained particles in a flue gas with an electrostatic precipitator having at least one charging electrode and at least one collecting electrode through the use of a signal determined from a rate of discharge of a charged electrode of the electrostatic precipitator.

26 Claims, 5 Drawing Sheets

FLUE GAS CONDITIONING AGENT DEMAND CONTROL APPARATUS

This is a continuation-in-part of U.S. patent application Ser. No. 07/864,847 filed Apr. 7, 1992 (by Express Mail Cert. No. TB000935/65US) entitled Flue Gas Conditioning System, now abandoned.

BACKGROUND OF THE INVENTION

This invention relates to a system for treating particulate-laden boiler flue gas with a conditioning agent to improve the removal of particulate matter by electrostatic means, and, more particularly, relates to a conditioning agent demand control apparatus used in controlling a flow of conditioning agent.

The increasing demand for electrical power has forced electrical utilities to burn increasing quantities of fossil fuels such as coal. However, electric utilities face increasing environmental standards that are imposed upon their operation. To reduce air pollutants, electrical utilities generally use a flue gas treatment system intended to remove the majority of the particulate matter in the gas effluent. A flue gas treatment system generally comprises an electrostatic means, such as an electrostatic precipitator, and a conditioning agent source for introducing a conditioning agent into the flue gas stream.

An electrostatic precipitator generally comprises at least one set of electrodes disposed within the flue gas stream path and positioned in the flue conduit. A transformer and rectifier apply DC (direct current) high voltage power to charging electrodes to produce a high voltage field between a charging electrode and a collecting electrode. Entrained particles travelling in the flue gas stream are charged and attracted to the collecting electrode in the electrostatic precipitator.

The efficiency of an electrostatic precipitator in removing particulate matter from the boiler flue gas is dependent, in part, upon the electrical resistivity of the entrained particulate matter in the boiler flue gas. The entrained particulate matter expelled from a boiler fired with low sulfur coal, i.e., coal having less than 1 percent sulfur, has been found to have a resistivity of approximately $10^{13}$ ohms/cm. It has been determined that efficient removal of particulate matter by electrostatic precipitation occurs when the particulate matter resistivity is approximately $10^8$ ohms/cm. Therefore, to obtain effective use of an electrostatic precipitator, the resistivity of the entrained particulate matter from low sulfur content coals must be reduced.

Electrical utilities have long used conditioning agents introduced into the flue gas stream prior to entry into the electrostatic precipitator to reduce the resistivity of the entrained particles. Various chemicals, such as water, anhydrous ammonia, and various ammonia-bearing solutions, sulfuric acid, sulfur trioxide and phosphoric acid, have been used as conditioning agents. Controlling the flow of the conditioning agent has been approached in a variety of ways.

U.S. Pat. No. 2,864,456 discloses an automatic control for electrostatic precipitators which varies both the electrostatic precipitator voltage and the supply of a conditioning agent, such as water, for conditioning particles to be removed by the electrostatic precipitator and to maintain an optimum sparking rate for efficient particle removal.

U.S. Pat. No. 3,523,407 discloses a method of improving the electrostatic precipitation of particles from a flue gas by adding preselected amounts of ammonia and water to the flue gas.

U.S. Pat. No. 3,665,676 discloses a system to condition the particles of boiler flue gas by the use of a salt solution such as a solution of ammonium sulfate or ammonium bisulfate. The salt solution is injected into the flue gas prior to entering the electrostatic precipitator and the system includes a metering means for controlling the amount of conditioner injected into the flue gas. U.S. Pat. No. 3,665,676 indicates that, if desired, conventional automatic controls can be provided to open the metering means when the flue gas reaches the desired operating temperature or to close it should the temperature fall below operating temperature. In addition, automatic controls can also be made to open the metering means to provide the amount of conditioner needed in proportion to the volume of gas to be conditioned.

U.S. Pat. No. 3,689,213 discloses a process for treating flue gas in which gaseous sulfur trioxide is generated in the immediate vicinity of the point of use as required by the quantity of fossil fuel being burned per unit time and is then introduced into the flue gas at a predetermined rate to facilitate fly ash removal by an electrostatic precipitator.

U.S. Pat. No. 3,772,178 discloses a system for the production of sulfur trioxide for flue gas conditioning including means to deliver a source of sulfur such as sulfuric acid to a vaporizer in proportion to the amount of flue gas from the boiler measured in terms of the electrical output generated at a particular time. As the production of flue gas changes in the boiler system, the proper ratio of acid to flue gas is automatically maintained by a control responsive to a signal coming from a boiler capacity index gauge to control the volume of sulfur trioxide being produced.

U.S. Pat. No. 3,993,429 discloses a system in which the temperature of operation of the catalytic converter is controlled by providing a second flow of air to be mixed with the output of the sulfur burner, detecting the temperature of the mixture of the second flow of air and the gases leaving the sulfur burner and varying the temperature of the air in the second flow of air to maintain a desired operating temperature for the catalytic converter. U.S. Pat. No. 3,993,429 further discloses that $SO_3$ flue gas conditioning systems can operate by sensing the rate of coal combustion and varying the rate of flow of sulfur into a sulfur burner in response to the rate of coal combustion.

U.S. Pat. No. 4,770,674 discloses a system for conditioning flue gas for an electrostatic precipitator, including equipment for converting sulfur into sulfur trioxide. The disclosed systems of U.S. Pat. No. 4,770,674 include a sulfur burner to produce oxidized sulfur, a catalytic converter to convert the oxidized sulfur to sulfur trioxide, and means to control sulfur and air inputs to the sulfur burner. Various inputs to the control means are disclosed, including the outlet temperature of the catalytic converter and such operating parameters of the exhaust stage of the system as the output temperature of the exhaust gas from the precipitator, the flow rate of the exhaust gas, the power delivered to or the speed of, an induced draft fan, if any, the opacity of the exhaust gas within the stack, and the power dissipated by the precipitator.

U.S. Pat. No. 4,779,207 discloses a system for preconditioning flue gas for electrostatic precipitation. The system of U.S. Pat. No. 4,779,207 includes a source of an $SO_3$ conditioning agent, a means for controllably adding the conditioning agent to the flue gas, a means for detecting the input power level of the electrostatic precipitators and control means for monitoring the input power level and controlling the amount of conditioning agent added to the gas to substantially maintain input power to the electrostatic precipitator to predetermined levels.

A controller commercially available from Castlet (Electronic Engineers) Ltd., of 14 Crofton Drive, Lincoln, England, can control an electrostatic precipitator by detecting the presence of deleterious back ionization and intermittently applying voltage to the charging electrodes of the precipitator to minimize back ionization. The Castlet controller detects back ionization by interrupting the applied charging voltage at its peak value and comparing, after a preset time, the actual charging electrode voltage with a programmed charging electrode voltage to identify excess charging electrode decay rate indicative of back ionization. The Castlet controller uses the difference in actual and programmed charging electrode voltage to determine a rate of application of voltage to the charging electrodes in an effort to optimize precipitator operation in the presence of conditions of back ionization.

U.S. Pat. No. 5,032,154 discloses, among other things, a system which provides direct, automatic control of the opacity of the effluent of a coal-fired boiler to maintain minimal opacity of the flue gas effluent passing from the boiler into the atmosphere. Systems of U.S. Pat. No. 5,032,154 provide a controlled flow of an agent, such as sulfur trioxide, to the boiler flue gas to condition its particulate matter for removal by electrostatic means, monitor precipitator power, and the opacity of the boiler flue gas after it leaves the electrostatic particle-removal means, and vary the controlled flow of conditioning agent to hunt and operate at conditioning agent flow rates determined from flue gas opacity alone or combined with precipitator power.

Other conditioning systems are shown, for example, in U.S. Pat. Nos. 3,686,825; 3,993,429; 4,042,348; 4,466,815; 4,533,364; and 4,624,685.

SUMMARY OF THE INVENTION

The invention provides a conditioning agent demand control method and apparatus to be used in a flue gas treatment system for controlling the flow of conditioning agent used in the removal of conditioned entrained particles from the flue gas with an electrostatic precipitator including at least one charging electrode and at least one collection electrode.

In the invention conditioning agent flow is controlled by a conditioning agent demand signal generated from a rate of discharge of the voltage of a charged electrode of the electrostatic precipitator. It has been discovered that such a rate of voltage decay can be used to indicate when conditioning agent will be needed and to provide an effective flow of conditioning agent to improve removal of entrained particulate matter from a boiler flue gas, and to preclude a wasteful flow of conditioning agent when it is not needed.

Methods and apparatus of the invention include signal means connected with the electrostatic precipitator for sensing a voltage discharge rate of an electrostatic precipitator charging electrode and generating a conditioning agent demand signal, and conditioning agent control means connected with the conditioning agent demand signal for controlling means for producing a flow of conditioning agent. In one embodiment of the invention, the signal means for generating a conditioning agent demand signal can include a voltage sensing circuit connected with the charging electrode to provide a voltage decay rate signal, and can further provide a rate-of-discharge circuit to generate said conditioning agent demand signal. In another embodiment, the signal means can generate a conditioning agent demand signal by comparing a charging electrode decay rate signal to a pre-programmed decay rate, preferably by comparing, after a programmed time, a voltage proportional to the voltage of the charging electrode with a programmed voltage. In both embodiments, the conditioning agent demand signal so generated can be applied to a conditioning agent control means for controlling a conditioning agent production means.

The invention is illustrated and described in more detail by the drawings and detailed description of preferred embodiments that follow.

A BRIEF DESCRIPTION OF THE DRAWINGS

DETAILED DESCRIPTION OF THE PREFERRED EMBODIMENT

Figure 1:
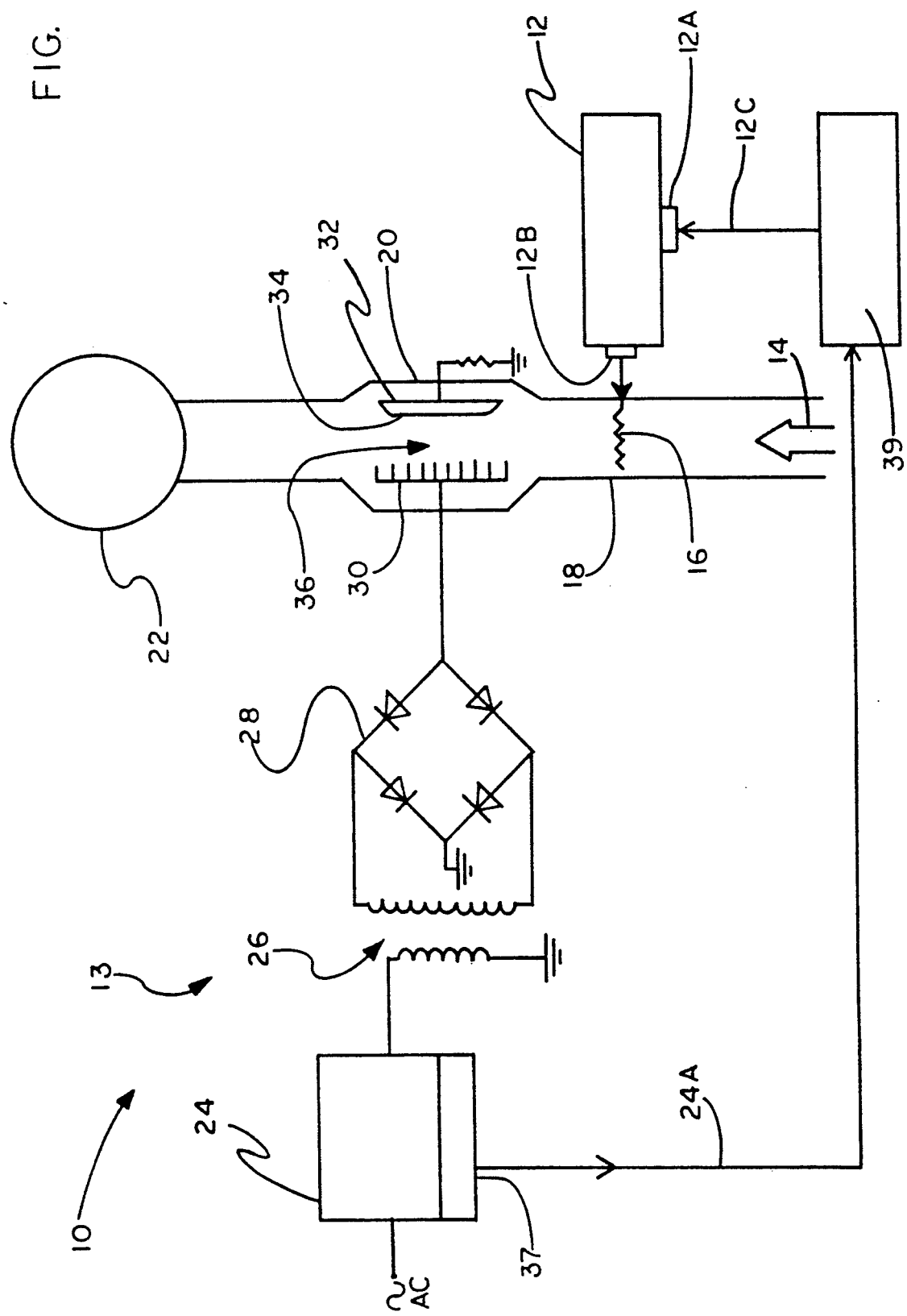
FIG. 1 shows a general diagrammatic representation of a flue gas treatment system embodying the present invention.

FIG. 1 shows a flue gas treatment system 10 incorporating the present invention. The system 10 includes means 12 for producing a flow of conditioning agent and an electrostatic precipitator system 13.

The means for producing a flow of conditioning agent, or conditioning system, 12 is shown having a conditioning agent demand signal 12C coupled to an input 12A. The conditioning agent demand signal 12C indicates conditioning agent that may be needed in the flue gas treatment system 10. In response to the conditioning agent demand signal 12C, conditioning system 12 produces a flow of conditioning agent, which is determined from the conditioning agent demand signal, from the conditioning agent output 12B. Conditioning system 12 introduces the flow of conditioning agent, preferably sulfur trioxide, into a flow of particulate-laden boiler flue gas (indicated generally by arrow 14) through injectors 16 positioned in a flue duct 18 upstream of electrostatic precipitator 20. The conditioning agent is mixed with the entrained particulate agent carried by the flue gas, thereby reducing the resistivity of the entrained particulate matter and aiding in the removal of particulate matter from the flue gas by the electrostatic precipitator system 13 prior to its expulsion into the atmosphere from stack 22.

Electrostatic precipitator system 13 includes an electrostatic precipitator controller 24 which supplies an AC output to a high voltage transformer 26. The AC output of high voltage transformer 26 is then converted to DC by rectifier 28. The output of rectifier 28 supplies DC high voltage and current to charging electrode 30. The collection electrode 32 of the electrostatic precipitator is grounded. The DC voltage and current supplied to charging electrode 30 creates a high voltage electric field between charging electrode 30 and collection electrode 32 which causes a corona discharge current. The resulting corona discharge current and ions charge the particulate matter of the flue gas passing through the electric field, and the charged particulate matter is then attracted to collection electrode 32.

Figure 2:
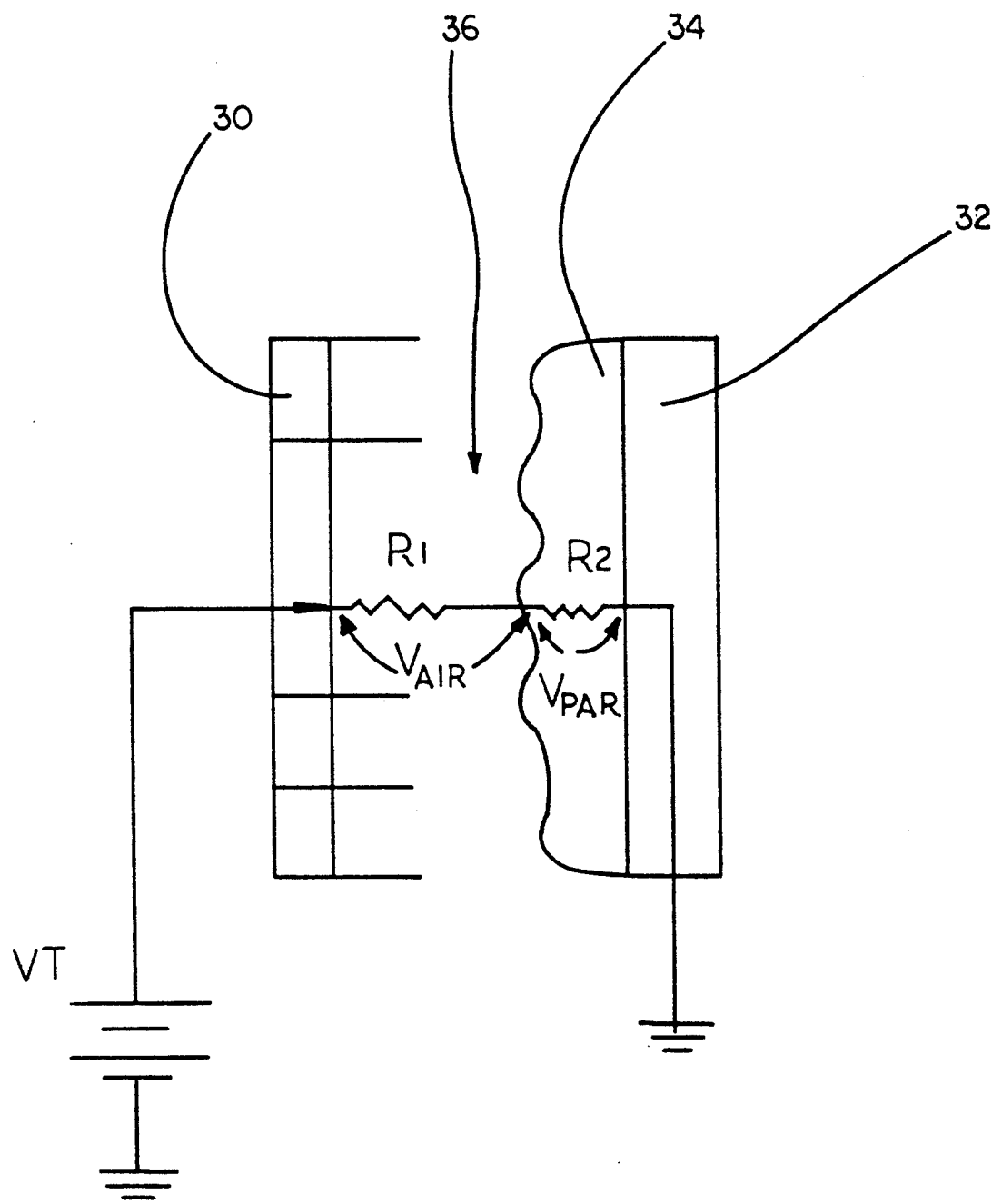
FIG. 2 shows a simplified schematic representation of the electrical characteristics of particle charging in an electrostatic precipitator to help explain the invention.

FIG. 2 depicts a simplified series circuit representation of the electrical relationship between charging electrode 30 and collection electrode 32. R1 represents the resistance of an air gap 36 between charging electrode 30 and an outer surface of collected particulate matter 34 collected on collection electrode 32. R2 represents the resistance of particulate matter 34 accumulated on collection electrode 32. As shown, the total charging electrode voltage (VT) applied to charging electrode 30 is equal to the sum of the effective voltage (Vair) across air gap 36 and the voltage drop (Vpar.) across collected particulate matter 34.

When the resistivity of the collected particulate matter 34 is high, the collected particulate matter 34 begins to act like an insulator. As the resistivity of the particulate matter 34 increases, a surface charge develops and the voltage dropped across collected particulate matter 34 increases, thus reducing the effective voltage across the air gap (Vair), i.e., between charging electrode 30 and the outer surface of collected particulate matter 34. A high effective air gap voltage is required to maintain an effective charging current, which will drop significantly if the air gap voltage becomes too low. As the surface charge and voltage across the collected particulate matter 34 increase, the dielectric strength of the layer of collected highly resistive particulate matter is exceeded and back ionization occurs. Back ionization substantially reduces the charging and collection of particulate matter and generally indicates the need for more conditioning agent in the flue gas stream to reduce the resistivity of entrained particulate matter.

As indicated above, the prior art Castlet electrostatic precipitator controller detects back ionization in an electrostatic precipitator by interrupting the AC input to a transformer 26 and rectifier 28 shown in FIG. 1 at the peak AC (which generally corresponds to the peak DC voltage on charging electrode 30) and by comparing actual charging electrode voltage decay with a programmed charging electrode voltage decay. The Castlet controller executes pre-programmed instructions to determine the existence of an excessive voltage decay of an electrostatic precipitator charging electrode by interrupting the applied charging electrode voltage at its peak, monitoring the decay of the charging electrode voltage and comparing the charging electrode voltage with a pre-programmed voltage after a pre-programmed time. The Castlet controller uses the results of the comparison to determine a frequency of voltage application at which the charging electrodes are recharged. A high number of charging voltage applications per second (high frequency) is intended to produce a relatively high effective voltage between the electrostatic precipitator charging and collection electrodes (i.e., Vair across the air gap) and corresponds to a lack of back ionization. For example, if the charging application is continuous, i.e., a 60 Hz AC application in a half wave rectifier system or a 120 Hz AC application in a full wave rectifier system, the effective voltage is at a maximum and the discharge rate of charging electrodes is low. A low number of charging voltage applications per second (low frequency such as 6 voltage applications per second or 6 Hz) is intended to operate at a lower average voltage to avoid back ionization. Therefore, the frequency of the charging voltage application of the controller is indicative of the discharge rate of charging electrodes.

This invention is based on the discovery that the frequency of voltage applications of a Castlet controller can be used to indicate the resistivity of the flue gas particulate matter collected by the electrostatic precipitator and the need for conditioning agent. In accordance with one embodiment of the invention, a method and apparatus are provided to monitor the frequency of application of voltage of a Castlet controller and provide a "decay rate signal", which can be interpreted to indicate the need, or lack of need, for conditioning agent and the flow rate of conditioning agent needed to provide a particulate resistivity for effective charging and removal.

In a system of the invention shown in FIG. 1, first means, or signal means can be adapted in accordance with this invention to determine a discharge rate of a charging electrode 30. Such a first means can include an electrostatic precipitator controller 24, such as a Castlet controller which can be modified and adapted with means 37 for using the frequency of voltage application and generating either a digital control signal or a 4-20 milli-ampere analog control signal, 24A, as described below, which will be related to the resistivity of collected particulate matter 34. The means 37 can convert the time or times between the application of voltage to the electrodes of the precipitator, or the frequency of its voltage applications, to a variable output, which may be either digital or analog by any of a number of well-known methods and apparatus.

As explained above, such a signal indicative of the voltage discharge of a precipitator charging electrode can be indicative of the resistivity of the collected particles conditioned and/or unconditioned. A controller 24 adapted to provide an output signal 24A related to discharge rate of charging electrode 30 can provide a signal indicative of the variable that conditioning systems seek to control, the resistivity of the particulate matter. Thus, as a result of the invention, an electrostatic precipitator system 13 including such a first means can provide a signal 24A based upon the indirect determination of the resistivity of the particulate matter in the flue gas treatment system which can be used by a control system 39 to produce a conditioning agent demand signal 12C.

Control system 39 can operate in a number of different ways to provide a conditioning agent demand signal. One control system 39 uses the discharge rate signal 24A by providing two set points separated by a dead band, with one of the set points indicating a need for conditioning agent and the other set point indicating that conditioning agent is not required. In this control system, the discharge rate signal is compared with the two set points. If, for example, the discharge rate signal crosses the set point indicating a need for conditioning agent, the control system 39 sends a conditioning agent demand signal 12c to the conditioning agent supply system 12. The conditioning agent supply system supplies conditioning agent to the flue gas until the discharge rate signal, in response to resistivity of the collected particulate matter in the precipitator, crosses the dead band and the set point indicating that conditioning agent is not needed. The control system 39 then terminates the conditioning agent demand signal 12c until the discharge rate signal 24A crosses the dead band and the set point indicating a need for conditioning agent, in response to resistivity of the collected particulate matter in the precipitator. In such systems, the conditioning agent supply system 12 is simply turned on and off and supplies conditioning agent at a rate selected by controller 39 from any of a number of system variables. Preferably, the rate of conditioning agent flow is determined from a boiler load signal in a manner well known in the art.

In another control system 39 the discharge rate signal 24A is sampled at an adjustable interval by the controller 39 and compared with a set point that is manually entered into the control system 39 to indicate a desired rate of discharge. The sampling interval periods between comparison of the actual discharge rate signal and set point, can be varied with comparisons being made every several minutes, for example, every 6 to 12 minutes. The control system 39 provides a conditioning agent demand signal 12C and preferably adjusts the conditioning agent flow rate up or down by step increases or decreases of conditioning agent flow rate which are varied in response to the difference between the set point discharge rate and the actual discharge rate signal at each sampling period. The magnitude of the step increases and step decreases in conditioning agent flow rate are determined by the control system 39 from the magnitude of the difference, between the actual discharge rate signal and the set point.

Figure 3:
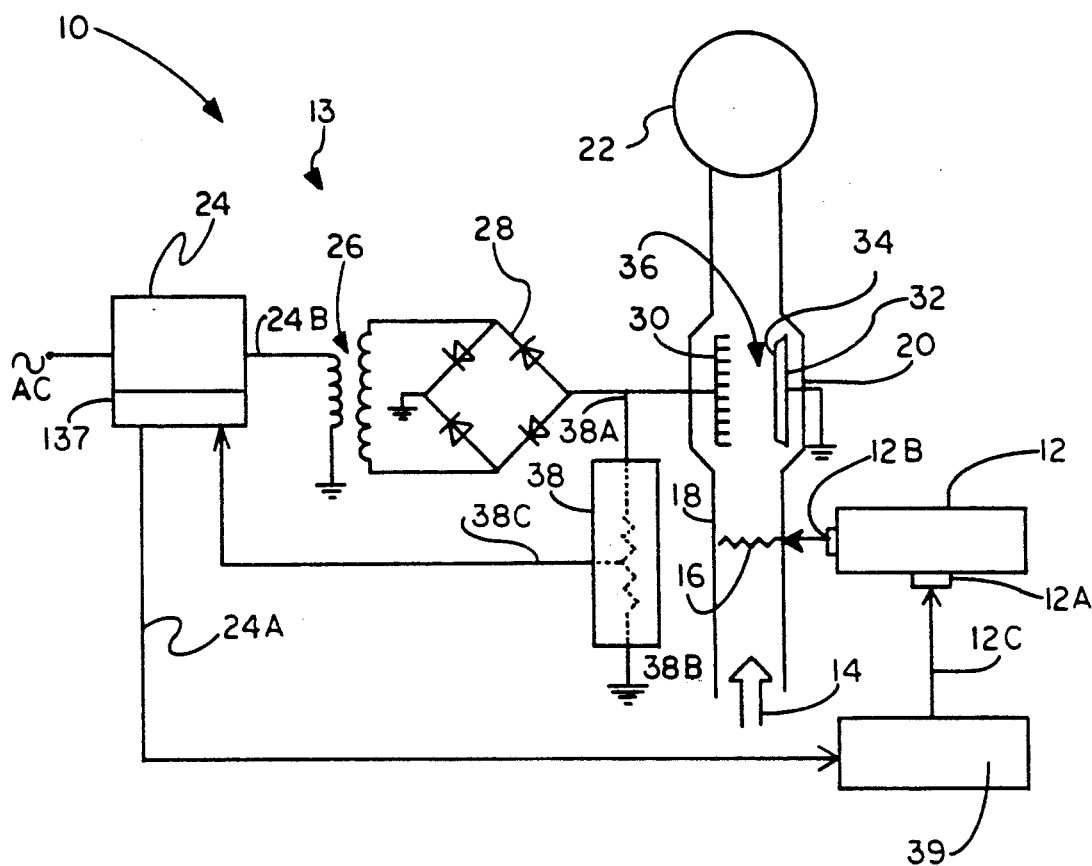
FIG. 3 shows a general diagrammatic representation of a flue gas treatment system embodying sensing means of the present invention.

An alternate first means for determining the decay rate of charging electrode 30 is also shown in FIG. 3 and is depicted by dashed lines. Controller 24, like the Castlet controller, is programmed to interrupt the voltage applied to the charged electrodes of the electrostatic precipitator at the peak applied voltage level. A first terminal 38A and a second terminal 38B of a signal means 38, such as a voltage divider, are coupled between an input of charging electrode 30 and ground, respectively. A third terminal 38C of signal means 38 is coupled to a first means 137. The voltage signal from signal means 38 indicates the voltage of charging electrode 30 as a function of time.

Figure 3A:
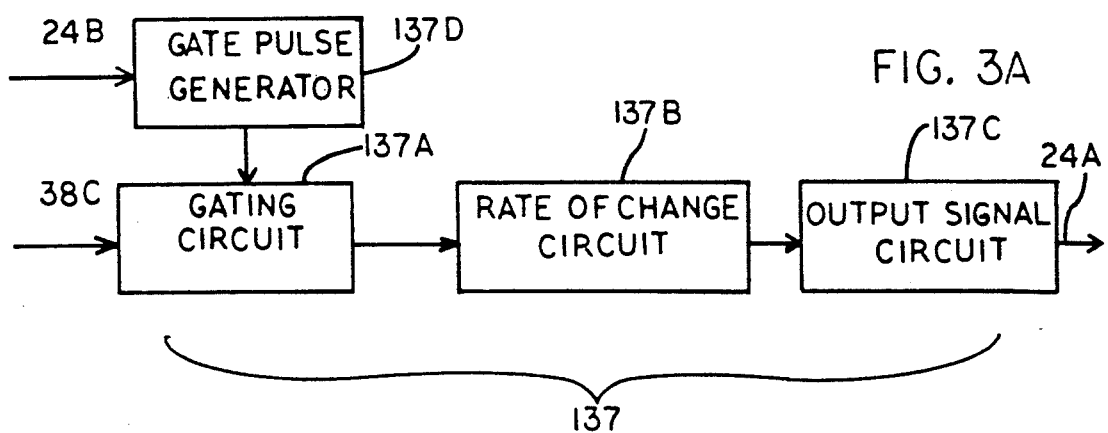
FIG. 3A is a block diagram of the means of FIG. 3 for generating a discharge rate signal.

Controller 24 is thus adapted with first means 137 for generating a signal 24A indicative of the resistivity of the particulate matter in the system. FIG. 3A shows one embodiment of such a means 137. As shown in FIG. 3A, the signal 38C from signal means 38 can be directed to an input of a gating circuit 137A. The gating input to gating circuit 137A can be generated by a gate pulse generating circuit connected with the output of controller 24. The gating circuit input is applied as the voltage that is applied to the charged electrodes of the electrostatic precipitator is interrupted, and the gating circuit input is applied to the gating circuit for a predetermined measurement period, or until voltage is again applied to the electrostatic precipitator electrodes. During the gating period, with no voltage applied to the charging electrodes, the signal from signal means 38C is passed by the gating circuit to a voltage rate of change circuit 137B, (such as a differentiator circuit or a circuit which compares the voltage signal with a programmed voltage after a programmed time). The voltage rate of change circuit 137B provides a voltage rate of change output (i.e., electrode voltage discharge rate) to an output signal circuit 137C. Output signal circuit 137C may use the output from the rate of change circuit 137B and provide either an analog or a digital output signal that may be converted to a conditioning agent demand signal by the conditioning agent control means 39.

Figure 4:
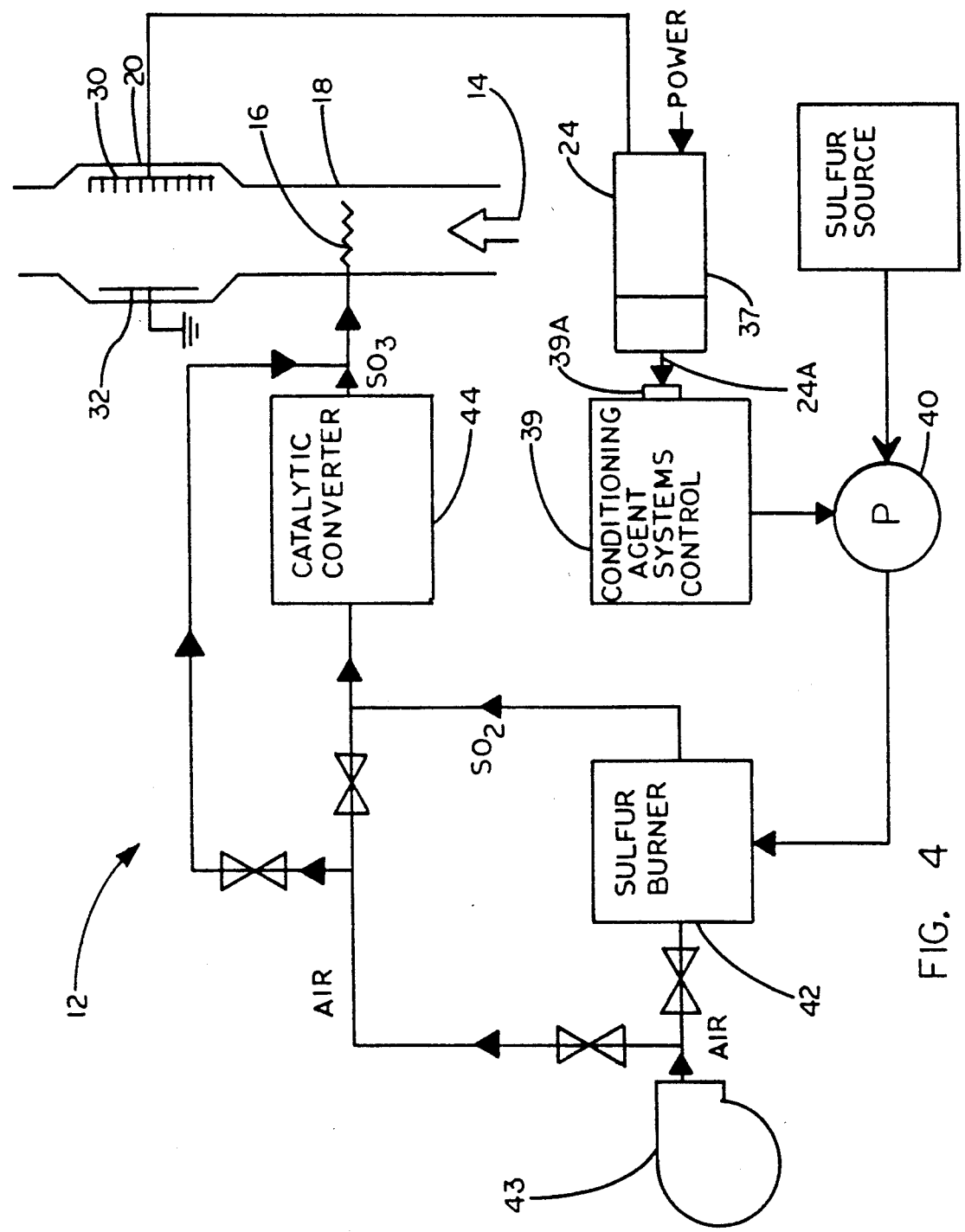
FIG. 4 shows a more detailed diagrammatic representation of a flue gas treatment system incorporating the present invention.

FIG. 4 shows a simplified representation of one preferred conditioning agent system 12 operated by a conditioning agent control means 39 connected with signal means 37 for monitoring a rate of discharge of a charged electrode 30 of the electrostatic precipitator 20 and providing therefrom a signal 24A which relates to the decay rate of charging electrode 30 and indicates a demand for sulfur trioxide. Signal means 37 can include a Castlet controller 24 which has been supplemented to generate signal 24A. Conditioning agent control means 39 uses signal 24A to control the flow of conditioning agent from system 12 as described above. As shown in FIG. 4, a preferred conditioning agent system 12 comprises means 40, such as a pump, to provide liquid sulfur to a sulfur burner 42. Such a preferred system converts the combustion products of sulfur burner 42, mostly $SO_2$, into a sulfur trioxide conditioning agent in a catalytic converter 44. The $SO_3$ conditioning agent is directed to injectors 16 which introduces the conditioning agent into the flow 14 of boiler flue gas where it conditions entrained particles for removal by electrostatic precipitator 20. The invention may be used with other means for producing a flow of conditioning agent, such as those using sources of liquid or gaseous $SO_2$ or other sulfur bearing substances, or sources of non-sulfurous conditioning agents.

In such preferred systems as that shown in FIG. 4, the signal 24A is coupled to input 39A of conditioning agent system control means 39 of conditioning system 12. Conditioning agent control means 39 uses the signal 24A to generate a conditioning agent demand signal to operate the sulfur pump 40. Where conditioning agent is needed for effective removal of entrained particles from the flue gas, sulfur pump 40 supplies a flow of liquified sulfur to sulfur burner 42 where the sulfur is burned in air supplied by a blower 43 to form a quantity of sulfur dioxide in air which passes through catalytic converter 44 thereby producing sulfur trioxide. As described above, control means 39 and signal means 37 can coact to operate sulfur pump 40 only when a rate of discharge of voltage of the charged electrode 30 indicates conditioning agent is needed (generally by the presence of back corona) or can adjust the flow of sulfur in variable steps to provide a variable rate of conditioning agent flow to improve the electrostatic removal of entrained particles by the precipitator 20.

Figure 5:
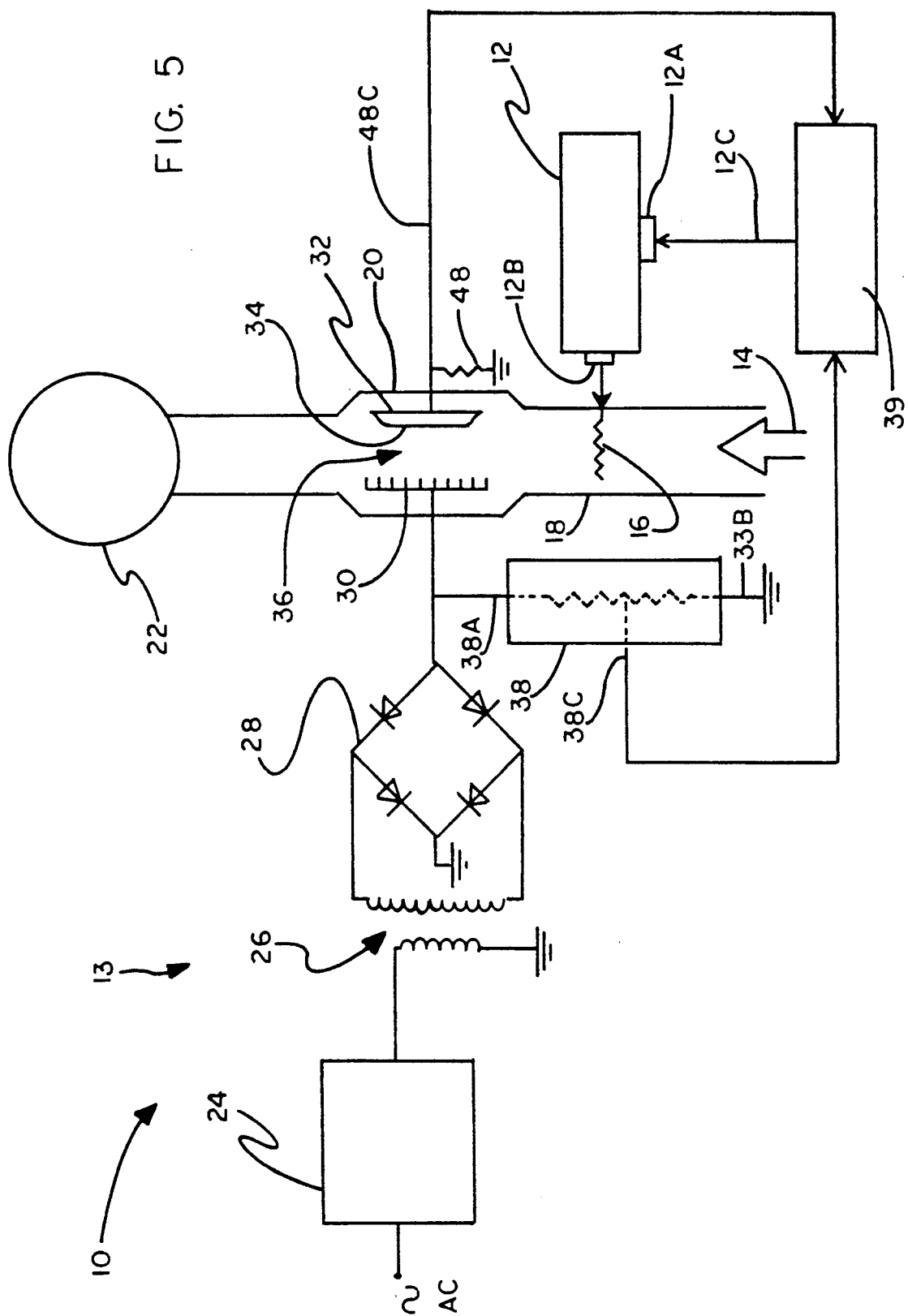
FIG. 5 shows a diagrammatic representation of a flue gas treatment system with an alternative embodiment of the present invention.

In another preferred embodiment, as shown in FIG. 5, conditioning agent system control means 39 can determine a conditioning agent demand signal from a sensing means 38, such as a voltage divider, connected with the charging electrode 30. Information on the rate of discharge of the voltage of charging electrode 30 can be determined by conditioning agent control means 39, which then produces a conditioning agent demand signal 12C related to a demand for conditioning agent and sends the signal from the control means 39 to input 12A of conditioning agent production system 12. In still another alternative embodiment, a discharge rate signal 48C for controller 39 can be generated by an electrical resistor 48 connecting a collector electrode 32 of the electrostatic precipitator to ground. Control means 39 is preferably a programmable digital control device with an A-D converter to convert the discharge rate information from sensing means 38 into digital form for use with a programmed algorithm to generate a conditioning agent demand signal for improved operation of the precipitator. The conditioning agent demand signal 12C is shown coupled to conditioning agent system input 12A. Conditioning system 12 uses the demand signal for the generation and adjustment of the flow of conditioning agent produced thereby and introduced into flue gas stream 14 through injectors 16 to reduce the resistivity of the entrained particulate matter in the flue gas.

The invention thus provides an improved method for supplying a flow of conditioning agent for removal of entrained particles with an electrostatic precipitator. In the method of the invention, a rate of discharge of a charging electrode of an electrostatic precipitator, preferably a voltage discharge rate, is determined, and a signal is generated from the discharge rate of said charged electrode for providing and controlling a flow of conditioning agent in response to the signal to maintain removal of entrained particles within acceptable limits. In the method, the rate of discharge of said charged electrode can be determined by interrupting power to said charged electrode and sensing the rate of voltage decay of said charged electrode. The rate of discharge of the voltage of the charged electrode can be determined by determining the voltage of the charged electrode at a preset time after interruption of power to the charged electrode and comparing the determined voltage with a pre-selected voltage. In the method power to the charging electrode can be interrupted after variable periods, which are determined from the sensed rate of voltage decay of said charged electrode, and the discharge rate signal can be generated from the frequency of the variable periods of power interruption. In another variation of the method, the conditioning agent demand signal can be determined by differentiation of the rate of discharge of the voltage of the charging electrode by the use of differentiating circuits, as well known in the electronic art.

It is well known in the art that the resistivity of particulate matter can be reduced by introducing a conditioning agent into the flue gas stream. The flow rate of conditioning agent produced has been frequently selected by the quantity of coal burned, flue gas opacity, etc. By using information on the discharge rate of the charged electrode of an electrostatic precipitator in deriving a conditioning signal for use by a conditioning system which is almost dependent upon the resistivity of the particulate matter being conditioned, which is the variable that flue gas conditioning systems seek to control.

In addition, the use of the invention permits a determination of satisfactory resistivity condition of particulate matter collected within the electrostatic precipitator which can permit the conditioning agent producing means to be shut down for periods of several hours, thus providing substantial savings in operating costs, which are not available with existing conditioning agent control systems.

Although the present invention has been described with reference to preferred embodiments, workers skilled in the art will recognize that changes may be made in form and detail without departing from the spirit and scope of the invention.

I claim:

1. A flue gas conditioning agent demand control apparatus for controlling flow of a conditioning agent for removal of entrained particles in a flue gas with an electrostatic precipitator having at least one charging electrode and at least one collection electrode, comprising:

first means for sensing a discharge rate of said charging electrode and for generating a conditioning agent demand signal related to said discharge rate of said charging electrode; and second means for producing a flow of conditioning agent connected with said conditioning agent demand signal, said second means providing a controlled flow of conditioning agent in relation to changes in said conditioning agent demand signal from said first means.

2. The apparatus of claim 1 wherein said first means further comprises precipitator control means for controlling and interrupting power to said precipitator charging electrode and said first means interrupts power to said charging electrode to sense said discharge rate of said charging electrode.

3. The apparatus of claim 2 wherein said first means supplies a digital conditioning agent demand signal.

4. The apparatus of claim 1 wherein said first means further comprises a conditioning agent control means which operates in response to said sensed discharge rate to generate said conditioning agent demand signal to provide a flow of said conditioning agent and maintain said discharge rate within predefined limits.

5. The apparatus of claim 1 wherein said first means comprises a voltage sensing circuit connected with said charging electrode to provide a voltage decay rate signal.

6. The apparatus of claim 5 wherein said first means further comprises differentiation means to generate said conditioning agent demand signal.

7. The apparatus of claim 2 wherein said first means determines said conditioning agent demand signal by comparing said discharge rate to a pre-programmed discharge rate.

8. The apparatus of claim 7 wherein said first means compares, after a programmed time, a voltage proportional to the voltage of the charging electrode with a programmed voltage.

9. A flue gas treatment system, comprising:

an electrostatic precipitator for removing particulate matter from flue gas and including at least one charged electrode and one grounded electrode;

a conditioning agent system for supplying a flow of conditioning agent to the flue gas to condition particulate matter in the flue gas for removal by the electrostatic precipitator;

signal means for monitoring a rate of discharge of the charged electrode of the electrostatic precipitator and providing therefrom a conditioning agent demand signal;

control means for said conditioning agent supply system, connected with said conditioning agent demand signal and for providing an operating signal for said conditioning agent supply system to provide a flow of conditioning agent to the flue gas in response to the conditioning agent demand signal.

10. The apparatus of claim 9 wherein said conditioning agent is generated by said conditioning agent system from liquified sulfur, and said conditioning agent control means adjusts the flow of liquified sulfur in response to changes in the conditioning agent demand signal.

11. The system of claim 9 wherein said system includes means for periodically interrupting power to said electrostatic precipitator.

12. The system of claim 11 wherein said signal means determines said conditioning agent demand signal by comparing said rate of discharge to a pre-programmed discharge rate.

13. The system of claim 12 wherein said signal means compares, after a programmed time, a voltage proportional to the voltage of the charged electrode with a programmed voltage.

14. The system of claim 9 wherein said signal means comprises a voltage sensing circuit connected with said charged electrode and with said signal means to provide a voltage decay rate signal to said signal means.

15. The system of claim 14 wherein said signal means comprises differentiation means to generate said conditioning agent demand signal.

16. In method for supplying a flow of conditioning agent for removal of entrained particles with an electrostatic precipitator having at least one charged electrode and at least one collection electrode, the improvement comprising the steps of:
  determining a rate of discharge of said charged electrode; and
  generating a signal from said discharge rate of said charged electrode for controlling a flow of conditioning agent and providing said flow of conditioning agent in response to said signal to maintain removal of entrained particle within acceptable limits.

17. The method of claim 16 wherein said rate of discharge of said charged electrode is determined by interrupting power to said charged electrode and sensing the rate of voltage decay of said charged electrode.

18. The method of claim 17 wherein said rate of discharge of said charged electrode is determined by determining the voltage of the charged electrode at a preset time after interruption of power to the charged electrode and comparing the determined voltage with a pre-selected voltage.

19. The method of claim 16 wherein said signal is determined by differentiating the rate of discharge of the charged electrode.

20. The method of claim 17 further comprising interrupting the power to said charged electrode after variable periods determined from the sensed rate of voltage decay of said charged electrode.

21. The method of claim 20 wherein said signal is generated from the frequency of the variable periods of power interruption.

22. In an apparatus for controlling the flow of conditioning agent to a flue gas system for removal of the entrained particles by the electrodes of an electrostatic precipitator, the improvement comprising means for sensing a voltage decay rate of at least one electrode of the electrostatic precipitator and means for generating a signal for use in determining conditioning agent demand from said sensed voltage decay rate.

23. The apparatus of claim 22 wherein said means further comprises precipitator control means for controlling and interrupting power to said precipitator charging electrode and said means interrupts power to said charging electrode to sense said discharge rate of said charging electrode.

24. The apparatus of claim 23 wherein said means generates said signal by comparing said discharge rate to a pre-programmed discharge rate.

25. The apparatus of claim 24 wherein said means compares, after a programmed time, a voltage proportional to the voltage of the charging electrode with a programmed voltage.

26. The apparatus of claim 25 wherein said means generates said signal as a digital signal for use by a conditioning agent controller.

* * * * *

UNITED STATES PATENT AND TRADEMARK OFFICE
CERTIFICATE OF CORRECTION

PATENT NO. : 5,288,309  Sheet 1 of 1
DATED : February 22, 1994
INVENTOR(S) : Robert A. Wright It is certified that error appears in the above-identified patent and that said Letters Patent is hereby corrected as shown below:

In Col. 9, line 53, after "conditioning" insert --agent demand--.

In Col. 9, line 53, after "signal" insert --, the present invention provides a signal--.

Signed and Sealed this

Fifth Day of September, 1995

Attest:

BRUCE LEHMAN

*Attesting Officer*    *Commissioner of Patents and Trademarks*